United States Patent
Sainaney (10) Patent No.: US 10,268,524 B2
(45) Date of Patent: Apr. 23, 2019

(54) PROCESSING TELEMETRY DATA STREAMS BASED ON AN OPERATING STATE OF THE DATA SOURCE

(71) Applicant: MOJ.IO INC., Vancouver (CA)

(72) Inventor: Narayan Sainaney, Vancouver (CA)

(73) Assignee: MOJ.IO INC., Vancouver (CA)

( * ) Notice: Subject to any disclaimer, the term of this patent is extended or adjusted under 35 U.S.C. 154(b) by 228 days.

(21) Appl. No.: 15/421,182

(22) Filed: Jan. 31, 2017

(65) Prior Publication Data
US 2018/0218034 A1    Aug. 2, 2018

(51) Int. Cl.
*G06F 16/27*      (2019.01)
*G06F 16/951*     (2019.01)
*G06F 9/52*       (2006.01)
*H04B 1/3822*     (2015.01)
*H04L 29/08*      (2006.01)
*H04L 12/24*      (2006.01)
(Continued)

(52) U.S. Cl.
CPC .......... *G06F 9/52* (2013.01); *G06F 16/24568* (2019.01); *H04B 1/3822* (2013.01); *H04L 41/0816* (2013.01); *H04L 43/08* (2013.01); *H04L 67/12* (2013.01); *H04L 67/2814* (2013.01); *G07C 5/0808* (2013.01); *H04L 43/16* (2013.01)

(58) Field of Classification Search
CPC ......... G06F 17/30554; G06F 17/30991; G06F 17/30112; G06F 17/30572; G06F 8/20; G06F 9/542; H04L 12/16; H04L 41/0816; H04L 43/08; H04L 67/12
See application file for complete search history.

(56) References Cited

U.S. PATENT DOCUMENTS

| 8,381,224 B2 * | 2/2013 | Huetter | G06F 9/5066 707/607 |
| 9,027,022 B2 * | 5/2015 | Huetter | G06F 9/5066 718/1 |

(Continued)

OTHER PUBLICATIONS

ISA Canadian Intellectual Property Office, International Search Report and Written Opinion Issued in Application No. PCT/CA2017/051465, dated Mar. 19, 2018, WIPO, 8 pages.

*Primary Examiner* — Daniel A Kuddus
(74) *Attorney, Agent, or Firm* — Alleman Hall Creasman & Tuttle LLP (57) ABSTRACT

A service platform processes telemetry data streams communicated by remote data sources, such as telematics devices located on-board a population of vehicles. The service platform includes two data processing stacks having different performance parameters. A high performance data processing stack includes a first application layer and a first database layer that collectively exhibit lesser latency between write/read persistency for a given task load. A low performance data processing stack includes a second application layer and a second database layer that collectively exhibit greater latency between write/read persistency for the same task load as compared to the high performance data processing stack. For each telemetry data stream received from a data source, depending on an operating state of that data source, messages of the data stream are directed to the high performance data processing stack or to the low performance data processing stack for processing.

18 Claims, 4 Drawing Sheets

(51) Int. Cl.
*H04L 12/26* (2006.01)
*G06F 16/2455* (2019.01)
*G07C 5/08* (2006.01)

(56) References Cited

U.S. PATENT DOCUMENTS

| | | | |
|---|---|---|---|
| 9,367,968 B2* | 6/2016 | Giraud et al. | G06F 17/30312 |
| 2001/0021901 A1* | 9/2001 | Ellis et al. | G06F 17/30312 |
| 2012/0324448 A1* | 12/2012 | Huetter | G06F 9/5066 |
| | | | 718/1 |
| 2014/0213238 A1* | 7/2014 | Giraud | G07C 5/008 |
| | | | 455/418 |
| 2014/0324862 A1* | 10/2014 | Bingham | G06F 9/45533 |
| | | | 707/737 |
| 2015/0215738 A1* | 7/2015 | Frusina | H04W 4/023 |
| | | | 455/426.1 |
| 2017/0201556 A1* | 7/2017 | Fox | H04L 65/605 |
| 2017/0255639 A1* | 9/2017 | Bingham | G06F 3/0488 |
| 2017/0257258 A1* | 9/2017 | Bingham | H04L 41/069 |
| 2017/0302710 A1* | 10/2017 | Fox | H04L 65/605 |
| 2017/0324862 A1* | 11/2017 | Seward | H04M 1/72583 |
| 2018/0191867 A1* | 7/2018 | Siebel | H04L 67/02 |

* cited by examiner

PROCESSING TELEMETRY DATA STREAMS BASED ON AN OPERATING STATE OF THE DATA SOURCE

BACKGROUND

Modern vehicles typically include an on-board electronic system that manages, measures, and reports operation of the vehicle's various subsystems. These on-board electronic systems may include or otherwise support on-board diagnostic (OBD) services that enable vehicle owners and repair technicians to access diagnostic information or other forms of operational information from the vehicle. For example, an on-board electronic system of a vehicle may be accessed via a data interface in the form of a physical connector or port. OBD information may be communicated over this data interface using a variety of protocols, including ALDL, OBD-I, OBD-1.5, OBD-II, etc., to name a few examples.

SUMMARY

A service platform processes telemetry data streams communicated by remote data sources, such as telematics devices located on-board a population of vehicles. The service platform includes two data processing stacks having different performance parameters. A high performance data processing stack includes a first application layer and a first database layer implemented on a first set of servers that collectively exhibit lesser latency between write/read persistency for a given task load. A low performance data processing stack includes a second application layer and a second database layer implemented on a second set of one or more servers that collectively exhibit greater latency between write/read persistency for the same task load as compared to the high performance data processing stack. For each telemetry data stream received from a data source, depending on an operating state of that data source, messages of the data stream are directed to the high performance data processing stack or to the low performance data processing stack for processing. This summary provides a non-limiting example of the subject matter described in further detail with regards to the Detailed Description and associated drawings.

DETAILED DESCRIPTION

Telemetry data streams received from a remote data source, such as a vehicle within the context of telematics, may be more efficiently processed at a service platform by considering a duty cycle of the remote data source. In real-world implementations, database systems often form a bottleneck in a data processing pipeline when processing streams of data from a data source (e.g., a vehicle). To scale these database systems, telemetry data streams are often stateless so that information in a time-based sequence of messages can be sent to different servers for processing, which allows the service platform to be scaled by adding more servers. A state of the data source (e.g., a vehicle) may be determined at the service platform and stored in a database of the service platform so that, should individual servers go down or within an updating process, the integrity of the state of the data source is maintained. Unfortunately, using a single database system to store the state of the data source as well as near term (e.g., 1 week) historical data can be expensive. High performance database systems with a relatively lower latency between processing a write request and the ability to process a read request for the updated data of the write request (i.e., write/read persistency) are often expensive and not practical for continuous storage over longer periods of time. Lower performance database systems with a relatively higher latency of write/read persistency are considerably cheaper; however, these lower performance database systems greatly reduce the throughput at which the state of the data source can be managed.

In an example, a service platform uses the duty cycle predictability of the throughput data stream to achieve optimal cost vs. performance. In the case of vehicle telematics, the service platform may use a relatively higher performance/higher cost data processing stack for the high duty cycle (e.g., active) state of the vehicle, and a relatively lower performance/lower cost data processing stack for the low/off duty cycle (e.g., inactive) state of the vehicle. The service platform may implement a hybrid data persistence layer to optimize for high duty cycles (e.g. when a vehicle is being operated in which there are a relatively greater number of changes to the state of the vehicle) and for low/off duty cycles (e.g. when the vehicle is not being operated and there are a relatively lesser number of changes to the state of the vehicle).

Figure 1:
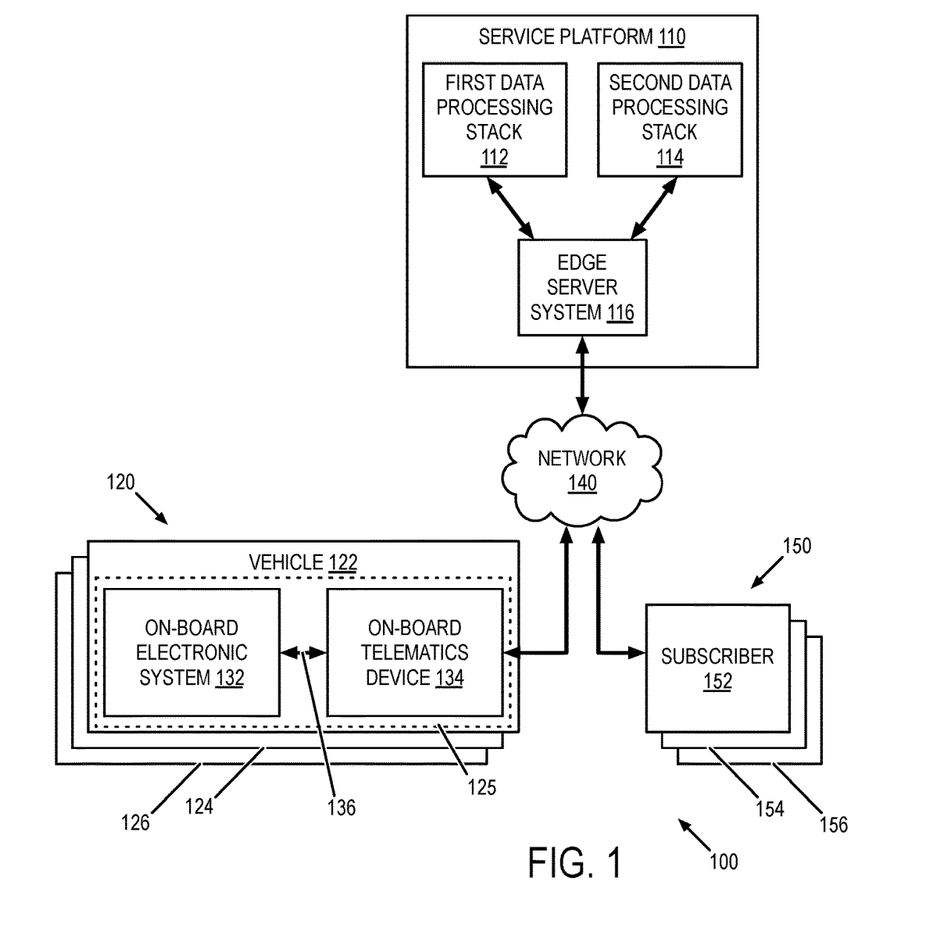
FIG. 1 is a schematic diagram depicting an example computing system 100.

FIG. 1 is a schematic diagram depicting an example computing system 100. Computing system 100 includes a service platform 110 that collects telemetry data reported by telematics devices associated with a population of vehicles. A vehicle population 120 is depicted schematically in FIG. 1. A vehicle population may include an individual vehicle or multiple vehicles. For example, a vehicle population may include tens, hundreds, thousands, millions, or more vehicles. In this example, vehicle population 120 includes example vehicles 122, 124, 126, etc. represented schematically in FIG. 1. Aspects of vehicle 122 are depicted in further detail.

Vehicle 122 includes an on-board electronic system 132. On-board electronic system 132 is typically integrated with the vehicle, and includes the vehicle's control system, on-board computing device(s) (e.g., logic and/or data storage), associated sensors, etc. Vehicle 122 further includes an on-board telematics device 134. Telematics device 134 may be a separate or separable device from on-board electronic system 132 in at least some implementations. For example, telematics device 134 may take the form of an aftermarket device that may be installed or otherwise carried on-board the vehicle. Alternatively, on-board telematics device 134 may be integrated with or form part of on-board electronic system 132 as indicated at 125 by the broken lines. In this configuration, the on-board telematics device and the on-board electronic system may optionally share hardware and/or software components, including logic devices, data storage devices, executable programs/firmware, power supply, etc. Other vehicles (e.g., 124, 126, etc.) of vehicle population 120 may each include a respective on-board electronic system and on-board telematics device. Each on-board telematics device represents a respective telemetry data source of service platform 110.

Telematics device 134 may interface with on-board electronic system 132 via a wired or wireless link (represented schematically at 136) to enable the exchange of communications, an electrical ground reference, and/or electrical power between on-board electronic system 132 and telematics device 134. Communications and an electrical ground reference may be bi-directional between telematics device 134 and on-board electronic system 132, or uni-directional from on-board electronic system 132 to telematics device 134 with respect to communications. Electrical power may be supplied to telematics device 134 by on-board electronic system 132 in at least some implementations. Alternatively or additionally, telematics device 134 may have its own power source (e.g., battery). In such case, power may not be supplied to telematics device 134 by on-board electronic system 132.

As a first example, telematics device 134 may include an OBD interface (e.g., an OBD connector) that interfaces with a corresponding OBD interface (e.g., a corresponding OBD connector or port) of the vehicle with which on-board electronic system 132 is operatively linked to enable the exchange of communications, electrical ground reference, and/or electrical power. In this example, telematics device 134 may be selectively removed from or installed on-board vehicle 122 via the two OBD connectors. As a second example, telematics device 134 may be hardwired into on-board electronic system 132, such as with regards to an integrated or permanent installation of the telematics device, to enable the exchange of communications, electrical ground reference, and/or electrical power. As a third example, telematics device 134 may communicate wirelessly with on-board electronic system 132 via a wireless communications link. In this example, both on-board electronic system 132 and on-board telematics device 134 may include or may be associated with a respective wireless interface device that supports transmission and/or reception of wireless communications.

On-board telematics devices of a vehicle population, such as example telematics device 134, may communicate with service platform 110 via a communications network 140. Communications between service platform 110 and on-board telematics devices may be over one or more wired links and/or one or more wireless links. Such communications may be bi-directional between on-board telematics device and the service platform, or uni-directional from one of the service platform or the on-board telematics device to the other. Communications network 140 may include one or more wide area network (WAN) components (e.g., the Internet or a portion thereof, including cellular/wireless edge components), one or more local area network (LAN) components, and/or one or more personal area network (PAN) components.

Typically, service platform 110 takes the form of a cloud-based service platform hosted by one or more servers. However, in another implementation, service platform 110 may be hosted on a computing device or set of computing devices associated with the vehicle owner or operator, or other suitable entity or organization. Because vehicles are necessarily moveable, communications between service platform 110 and on-board telematics devices are typically over a WAN using a wireless link between the telematics device and cellular/wireless edge components of the WAN, and by wired (and/or wireless) links through the WAN to an edge of the service platform. This implementation enables data to be exchanged between the vehicles and the service platform in real-time and during vehicle operation. Here, on-board telematics devices each include a wireless interface device that supports transmission and/or reception of wireless communications to achieve connectivity with communications network 140. In another implementation, data may be exchanged between vehicles and the service platform at defined intervals or upon specific conditions, such as when the on-board telematics device is physically connected to communications network 140 via a wired link or when the vehicle has entered within range of a trusted wireless LAN of a home, business, etc.

Service platform 110 may include an edge server system 116 that includes a set of one or more server devices. Edge server system 116 may handle ingress of telemetry data streams from a population of many data sources, including on-board telematics devices, for example. A telemetry data stream includes a plurality of messages communicated by a data source (e.g., a telematics device located on-board a vehicle) over time in a time-based sequence in which each message contains telemetry data of the data source at a particular point in time or for a given time period. Furthermore, a population of many data sources may each communicate a respective telemetry data stream to the service platform at the same time or in parallel with each other.

Edge server system 116 may further host a data persistence layer that enables subscribers of telemetry data to access telemetry data or processed forms thereof from service platform 110. Servers of edge server system 116 may be geographically distributed or collocated, depending on implementation. In this example, edge server system 116 represents the edge of the service platform 110. Communications directed to the service platform from external sources, such as on-board telematics devices and/or other computing devices (e.g., associated with subscribers 150), may be received by edge server system 116 and then directed (e.g., routed) to other computing systems of the service platform, such as the computing systems that implement first and second data processing stacks 112, 114. Communications directed from the service platform to external sources, such as on-board telematics devices and/or other computing devices (e.g., associated with subscribers 150), may be received by edge server system 116 from internal sources (e.g., other computing systems) of the service platform and then directed (e.g., routed) to on-board telematics devices and/or other computing devices (e.g., associated with subscribers 150).

Service platform 110 includes two data processing stacks having different performance parameters. A first data processing stack 112 of the service platform includes a first application layer and a first database layer implemented on a first set of one or more servers that collectively exhibit lesser latency between write/read persistency for a given task load. This first data processing stack may be referred to as a high performance/performant data processing stack. A second data processing stack 114 of the service platform includes a second application layer and a second database layer implemented on a first set of one or more servers that collectively exhibit greater latency between write/read persistency for the same task load as compared to the first data processing stack. This second data processing stack may be referred to as a low performance/performant data processing stack.

The data persistence layer hosted by the edge server system 116 may implement a rule set that defines a set of programmatic operations that are to be performed by the edge server system in response to a set of operating conditions. For example, for each telemetry data stream received at edge server system 116, depending on an operating state of the data source (e.g., on-board telematics device), the messages of that data stream may be directed to first processing stack 112 or to second processing stack 114 for processing. As described in further detail with reference to method 200 of FIG. 2, messages received from a data source having an operating state that corresponds to active state of operation of the data source may be routed by the data persistence layer to the first data processing stack 112 (i.e., the high performance data processing stack) for processing. By contrast, messages received from a data source having an operating state that corresponds to inactive state of operation of the data source may be routed by the data persistence layer to the second data processing stack 112 (i.e., the low performance data processing stack) for processing.

Computing system 100 further includes a subscriber population 150. A subscriber may refer to a network address to which data may be sent or from which data may be received. Subscribers may take the form of a computing device or set of computing devices. For example, a subscriber may refer to an email address or IP address to which data is to be reported by service platform 110 in which a user may access the data sent to the email address or IP address via a computing device. A subscriber population may include an individual subscriber or multiple subscribers. A subscriber population may include tens, hundreds, thousands, millions, or more subscribers. In this example, subscriber population 150 includes example subscribers 152, 154, 156, etc. represented schematically in FIG. 1. Subscriber 152, may correspond to an application program operating on a mobile device of an owner of vehicle 122, for example.

Figure 2:
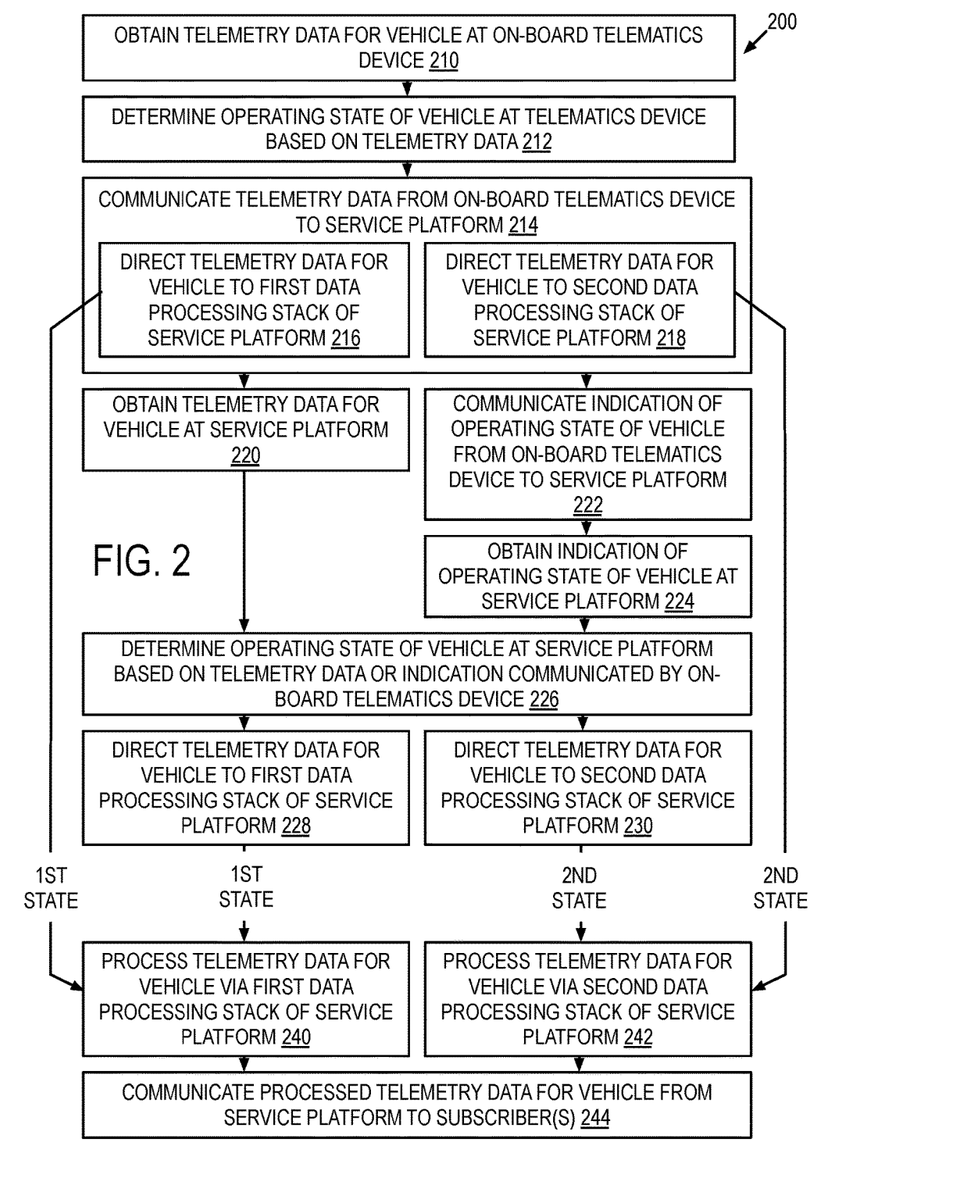
FIG. 2 is a flow diagram depicting an example method associated with communicating and processing telemetry data.

FIG. 2 is a flow diagram depicting an example method 200 associated with communicating and processing telemetry data. Method 200 or portions thereof may be performed by a computing system, such as previously described computing system 100 of FIG. 1. For example, the various operations and processes of method 200 may be performed by one or more computing devices of the computing system executing instructions in the form of client-side and/or server-side programs.

At 210, the method includes obtaining telemetry data for a vehicle at an on-board telematics device. The on-board telematics device may obtain the telemetry data by receiving some or all of the telemetry data from an on-board electronic system of the vehicle over a wired or wireless link. Alternatively or additionally, the on-board telematics device may obtain the telemetry data from one or more sensor devices of the on-board telematics device. Non-limiting examples of sensor devices of the on-board telematics device are described in further detail with reference to FIG. 3. Accordingly, the telemetry data obtained at 210 may include telemetry data received from the on-board electronic system of the vehicle or from sensor devices of the on-board telematics device. The telemetry data obtained from the on-board electronic system of the vehicle may include or otherwise indicate an ignition state (e.g., on or off) of the vehicle, an identifier of the vehicle (e.g., a VIN), or any other suitable OBD data.

At 212, the method includes determining an operating state of the vehicle at the telematics device based on the telemetry data obtained at 210. This operating state may be used by the on-board telematics device and/or service platform to determine whether the telemetry data is processed by a first or a second data processing stack of the service platform. To the extent that the operating state influences selection of the data processing stack, this operating state may be referred to as the path-determinative operating state. For example, the telematics device search for and identify a data value or other indicator within the telemetry data received from the on-board electronic system that indicates whether the vehicle is presently operating in a first operating state or a second operating state. The first operating state may correspond to an active operating state of the vehicle, and the second operating state may correspond to an inactive operating state of the vehicle. An active operating state of the vehicle is typically characterized by an ignition-on condition identified within the telemetry data, and the inactive operating state of the vehicle is typically characterized by an ignition-off condition identified within the telemetry data. In at least some implementations, operation 212 may be omitted, such as where a determination of operating state is performed at a service platform, as will be described with reference to operation 226.

In at least some implementations, the telemetry data communicated by an on-board telematics device may take the form of a time-based sequence of messages that collectively may be referred to as a data stream. Each message of the data stream may correspond to telemetry data obtained at a data source (e.g., a vehicle) at a different instance in time, for example. Each message may include one or more data items in which each data item contains a data value and optionally a data parameter identifier that identifies the parameter to which the data value pertains. For example, a message may include a data item that indicates whether an ignition of the vehicle is on or off. A message may contain tens, hundreds, thousands, etc. of data items. In at least some implementations, the data parameter identifiers may be omitted, such as where a format or ordering of the data values within the message identifies the particular data parameter to which data values pertain, such as may be identified or otherwise interpreted by the service platform, for example.

A data stream may be referred to as stateless or as including stateless data with respect to a data source if the telemetry data contained within individual messages does not, on its own, enable one or more states of the vehicle to be determined. For example, some or all of the telemetry data communicated by the on-board telematics device may indicate a change (e.g., magnitude and direction) from a previous measurement or state, or such data may be combined to obtain a measurement with respect to a higher-level state. For example, a driving efficiency measurement for the vehicle may be obtained by combining two or more data parameters and their corresponding data values over a period of time using a pre-defined function. As another example, a heading of the vehicle may be determined by comparing a current position of the vehicle to one or more previous positions reported by the vehicle in a time-based sequence. In such stateless operations, knowledge of the previous state of the data source or previously communicated telemetry data is necessary to determine the current state of the data source based on newly reported set of telemetry data. Transfer between first and second data processing stacks may be referred to as transfer of state management within the context of processing stateless telemetry data. Depending on the path-determinative operating state of the vehicle, the first or second data processing stack of the service platform updates the set of state information for the vehicle based on new telemetry data arriving from the data source and the previous set of state information for the vehicle. The transfer of state management between a first and second data processing stack may involve the passing of pre-transfer state information from the previous data processing stack to the current data processing stack, at least within the context of stateless telemetry data streams.

At 214, the method includes communicating the telemetry data from the on-board telematics device to the service platform. The telemetry data may be communicated in raw and/or processed forms, such as in implementations where the on-board telematics device processes the telemetry data prior to communicating with the service platform. The telemetry data may be communicated as one or more messages formatted according to any suitable communications protocol that is supported by the service platform. The telemetry data may be communicated as a time-based sequence of messages that collectively form a telemetry data stream for the vehicle. In at least some implementations, the on-board telematics device communicates the telemetry data to a network address or set of network addresses associated with an edge server system hosting a data persistence layer (or with the first or second data processing stacks) of the service platform, such as previously described with reference to edge server system 116.

Operation 214 may include sub-processes 216 and/or 218 for implementations in which the on-board telematics device determines the operating state of the vehicle, at least with respect to the path-determinative operating state. As previously described, the on-board telematics device may communicate the telemetry data to the edge server system of the service platform in at least some implementations. Here, the edge server system directs the telemetry data communicated by the on-board telematics device to the appropriate data processing stack of the service platform on-behalf of the on-board telematics device. However, in other implementations, such as where the on-board telematics device has determined the path-determinative operating state of the vehicle, the on-board telematics device may instead communicate the telemetry data to a network address or set of network addresses associated with either a first or second data processing stack of service platform, and the edge server system may be optionally omitted. For example, at 216, the method includes directing the telemetry data for the vehicle to a first data processing stack of the service platform responsive to the vehicle operating in the first operating state. Here, for example, the first data processing stack corresponds to the high performance data processing stack of the service platform and the first operating state corresponds to the active state of the vehicle. At 218, the method includes directing the telemetry data for the vehicle to a second data processing stack of the service platform responsive to the vehicle operating in the second operating state. Here, for example, the second data processing stack corresponds to the low performance data processing stack of the service platform and the second operating state corresponds to the inactive state of the vehicle. Example interactions between the on-board telematics device, edge server system, and first and second data processing stacks will be described in further detail with reference to FIG. 4.

At 220, the method includes obtaining the telemetry data for the vehicle at the service platform that was communicated from the on-board telematics device. For implementations in which the on-board telematics device determines the operating state of the vehicle, at 222, the method includes communicating an indication of the operating state of the vehicle from the on-board telematics device to the service platform. In at least some implementations, operation 220 may be performed by the on-board telematics device responsive to a change in operating state of the vehicle between the active or inactive operating states (as examples of a path-determinative operating state).

At 224, the method includes obtaining the indication of the operating state of the vehicle at the service platform that was communicated from the on-board telematics device. Operations 222 and 224 may be omitted for implementations in which the on-board telematics device does not determine the operating state of the vehicle. For implementations in which an edge server system is used to direct the telemetry data to the appropriate data processing stack of the service platform, the edge server system obtains the telemetry data and/or indication of the operating state of the vehicle at 224. Operations 220, 222, and/or 224 may be omitted in implementations in which the edge server system is omitted. The telemetry data obtained at 220 (or at 240, 242) may include or otherwise indicate an ignition state (e.g., on or off) of the vehicle, an identifier of the vehicle (e.g., a VIN), an identifier of the on-board telematics device, any other suitable OBD data, or any suitable data captured via sensor devices of the on-board telematics device.

At 226, the method includes determining the operating state of the vehicle at the service platform based on the telemetry data obtain at operation 220 or the indication of the operating state of the vehicle communicated by the on-board telematics device and obtained by the service platform at operations 222 and 224. Operation 226 may be performed by the edge server system in at least some implementations, as described above. In another implementation, one of the first or second data processing stacks of the service platform may perform operation 226, and then redirect the telemetry data if the data is destined for the other data processing stack. As an example, the edge server system may search for and identify a data value or other indicator within the telemetry data received from the on-board telematics device that indicates whether the vehicle is presently operating in a first operating state or a second operating state. The first operating state may correspond to an active operating state of the vehicle, and the second operating state may correspond to an inactive operating state of the vehicle. Again, an active operating state of the vehicle is typically characterized by an ignition-on condition identified within the telemetry data, and the inactive operating state of the vehicle is typically characterized by an ignition-off condition identified within the telemetry data.

At 228, the method includes directing the telemetry data for the vehicle to the first data processing stack of the service platform responsive to the vehicle operating in the first operating state. Here, for example, the first data processing stack corresponds to the high performance data processing stack of the service platform and the first operating state corresponds to the active state of the vehicle. Accordingly, messages conveying the telemetry data for a vehicle may be routed to the first data processing stack responsive to indication of the active operating state of that vehicle.

At 230, the method includes directing the telemetry data for the vehicle to the second data processing stack of the service platform responsive to the vehicle operating in the second operating state. Here, for example, the second data processing stack corresponds to the low performance data processing stack of the service platform and the second operating state corresponds to the inactive state of the vehicle. Accordingly, messages conveying the telemetry data for a vehicle may be routed to the second data processing stack responsive to indication of the inactive operating state of that vehicle. Through implementation of operations 226, 228, and 230, the persistence layer of the service platform can use the high performance data processing stack to process messages of the telemetry data stream during high duty cycles (e.g., active operating state) and switches to the low performance data processing stack when the high duty cycle ends (e.g., upon receiving indication of an inactive operating state) for the vehicle.

Depending on whether the telemetry data for the vehicle was directed to the first or second data processing stack, at 240, the method includes processing the telemetry data for the vehicle via the first data processing stack of the service platform, or at 242, the method includes processing the telemetry data for the vehicle via the second data processing stack of the service platform. The processing performed at operations 240 or 242 by the respective data processing stacks may include storing the telemetry data, processing the telemetry data to obtain a processed form thereof, and associating the telemetry data in raw or processed forms with a vehicle identifier, telematics device identifier, time stamps, user identifier, subscriber identifier, etc.

At 244, the method includes communicating the processed telemetry data for the vehicle from the service platform to one or more subscribers. For example, a data persistence layer of the edge server system may process requests from subscribers for telemetry data or processed forms thereof and/or may push such data to subscribers based on prior subscriptions established at the service platform. Data communicated at 244 may be used within application programs operating at other computing devices to present the telemetry data or processed forms thereof to users, such as via a graphical user interface or other suitable user experience modality. Method 200 may be performed for each vehicle of a population of vehicles, and may be performed continuously or at periodic intervals with regards to each vehicle individually.

Figure 3:
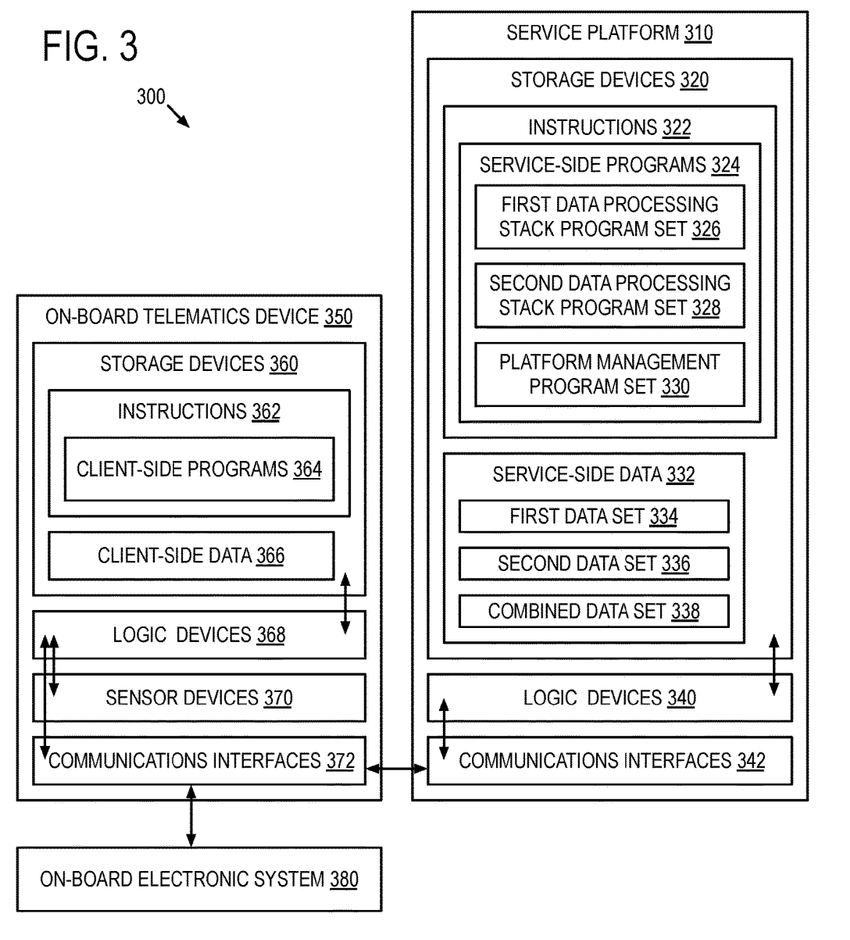
FIG. 3 is a schematic diagram depicting an example computing system including additional aspects of a service platform and an on-board telematics device.

FIG. 3 is a schematic diagram depicting a computing system 300 including additional aspects of a service platform 310 and an on-board telematics device 350. Computing system 300 may represent a non-limiting example of some of the previously described components of computing system 100 of FIG. 1. For example, service platform 310 may represent a non-limiting example of service platform 110, and on-board telematics device 350 may represent a non-limiting example of on-board telematics device 134.

Service platform 310 may include a set of one or more computing devices. A computing device may include a set of one or more logic devices (e.g., computer processors), and a set of one or more data storage devices. A set of data storage devices 320 and a set of logic devices 340 are represented schematically in FIG. 3. The set of data storage devices 320 may have instructions 322 and/or data 332 stored thereon, which may be referenced and/or updated by the set of logic devices 340. Logic devices may read or write data and/or instructions to or from the data storage devices.

Instructions 322 may include a set of one or more service-side programs 324 that are implemented by the set of logic devices 340. Implementation of service-side programs 324 by one or more logic devices of the service platform may provide one or more of the operations and/or processes described herein or otherwise enable the functionality of the service platform, such as previously described with reference to FIGS. 1 and 2. For example, service-side programs 324 may include a first data processing stack program set 326, a second data processing stack program set 328, and a platform management program set 330. Implementation of first data processing stack program set 326 by one or more logic devices of a first set of servers of the service platform may correspond to the previously described first data processing stack 112 of FIG. 1, and may include first application and/or first database layers. The first database layer may correspond to a REDIS cache-based database system, as a non-limiting example of a high performance database system. Implementation of second data processing stack program set 328 by one or more logic devices of a second set of servers of the service platform may correspond to the previously described second data processing stack 114 of FIG. 1, and may include second application and/or second database layers. The second database layer may correspond to a MongoDB or ElasticSearch-based database system, as a non-limiting example of a low performance database system. Implementation of platform management program set 330 by one or more logic devices of the service platform may correspond to the previously described edge server system 116 of FIG. 1, including the persistence layer thereof.

Data 332 stored in the set of data storage devices 320 may be referred to as service-side data within the context of such data residing at service platform 310. Data 332 may include a first data set 334, a second data set 336, and a combined data set 338 of the first and second data sets. First data set 334 may include data that is received and processed via the first data processing stack, and the second data set 336 may include data that is received and processed via the second data processing stack of the service platform. Platform management program set 330 may maintain a state table for each data source (e.g., vehicle) that enables the service platform to determinate whether a particular vehicle is presently operating in an active or inactive operating state, as non-limiting examples of path-determinative operating states with respect to the data processing stacks. This state table may further indicate whether the telemetry data for that vehicle is presently being directed to the first or second data processing stack. Additionally, platform management program set 330 may maintain a table that identifies whether data transfer operations between the data processing stacks have been completed or are in queue or in-process with respect to a particular vehicle.

Service platform 310 further includes a set of one or more communications interfaces 342 that enables the service platform to communicate with other computing devices over a communications network, such as on-board telematics device 350. On-board telematics device 350 may include a set of one or more computing devices. A computing device may include a set of one or more logic devices (e.g., computer processors), and a set of one or more data storage devices. A set of data storage devices 360 and a set of logic devices 368 are represented schematically in FIG. 3. The set of data storage devices 360 may have instructions 362 and/or data 366 stored thereon, which may be referenced and/or updated by the set of logic devices 368. Logic devices may read or write data and/or instructions to or from the data storage devices.

Instructions 362 may include one or more client-side programs 364 that are implemented by the set of logic devices 368. For example, client-side programs 364 may include a client-side application program and/or firmware of the on-board telematics device. Implementation of the set of client-side programs 364 by one or more logic devices of the on-board telematics device may provide one or more of the operations and/or processes described herein or otherwise enable the functionality of the on-board telematics device, such as previously described with reference to FIGS. 1 and 2.

Data 366 stored in the set of data storage devices 360 may be referred to as client-side data within the context of such data residing at on-board telematics device 350. Data 366 may include data obtained from an on-board electronic system 380 of the same vehicle with which the on-board telematics device interfaces. Data 366 may additionally or alternatively include data obtained via a set of one or more sensor devices 370 of on-board telematics device 350. Data 366 may include data in raw and/or processed forms. For example, data obtained via the set of sensor devices 370 and/or from on-board electronic system 380 of a vehicle may be stored in raw form within the set of storage devices 360. This raw data may be processed on-board the vehicle by the set of logic devices 368 to obtain processed data, and such processed data may be stored within storage devices 360. Furthermore, client-side data may be communicated by on-board telematics device 350 to service platform 310 over a communications network via their respective communications interfaces. Service platform 310 may receive the client-side data and store the client-side data in its original form and/or in a processed form thereof within the set of storage devices 320 as service-side data 332.

Figure 4:
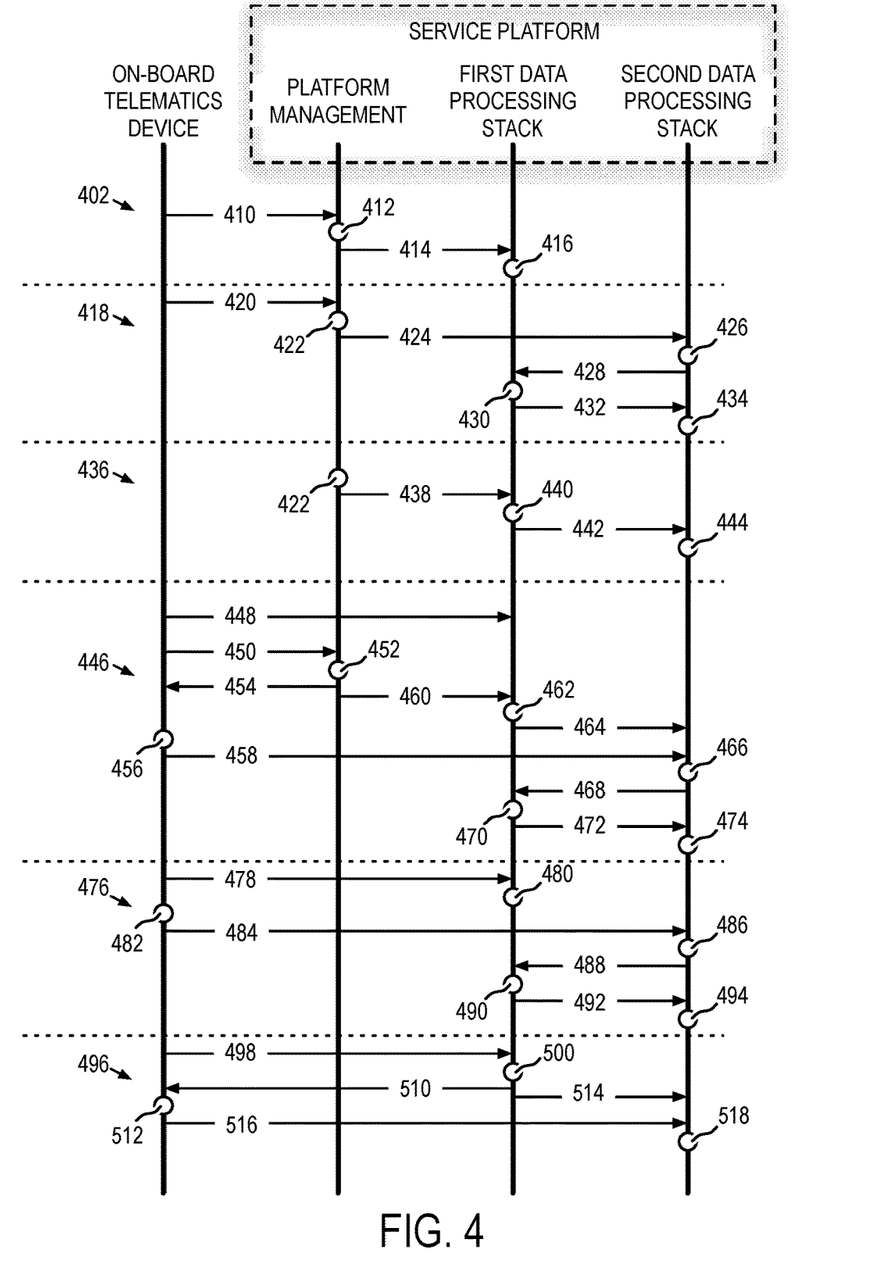
FIG. 4 is a timeline diagram depicting example interactions between an on-board telematics device and components of a service platform.

FIG. 4 is a timeline diagram depicting example interactions between an on-board telematics device and components of a service platform. The on-board telematics device of FIG. 4 may refer to an example of the previously described on-board telematics devices. The service platform of FIG. 4 may likewise refer to an example of the previously described service platform. For example, the service platform of FIG. 4 may include a platform management component, a first data processing stack component, and a second data processing stack component. The platform management component may include the data persistence layer and may take the form of a platform management program set (e.g., 330 of FIG. 3) implemented by one or more servers (e.g., edge server system 116 of FIG. 1). The first and second data processing components may take the form of first and second data processing program sets (e.g., 112, 114 of FIG. 1 or 326, 328 of FIG. 3) implemented by first and second groups of servers, respectively.

Within FIG. 4, a first set of interactions indicated at 402 includes the on-board telematics device, at 410, communicating telemetry data (and optionally an indication of a path-determinative operating state if pre-determined by the on-board telematics device) for the vehicle to the service platform. At 412, the platform management component obtains and processes the telemetry data to determine the path-determinative operating state of the vehicle based on telemetry data (or based on the indication provided by the on-board telematics device if pre-determined on-board the vehicle). Based on the path-determinative operating state identified at 412, the platform management component, at 414, directs the telemetry data to the first data processing stack. At 416, the first data processing stack obtains and processes the telemetry data for the vehicle. Such processing may include maintaining a set of vehicle state information based on stateless telemetry data that is directed to the first data processing stack from the on-board telematics device. The telemetry data communicated at 410 and 414 may represent a data stream of multiple data communications (e.g., messages) occurring over a period of time. In such case, the first data processing stack may continue by updating the set of vehicle state information based on and responsive to the telemetry data obtained in each successive communication from the on-board telematics device.

A second set of interactions indicated at 418 provides an example of a transfer of state management from the first data processing stack to the second data processing stack. At 420, the on-board telematics device communicates telemetry data (and optionally an indication of an operating state if pre-determined by the on-board telematics device) for the vehicle to the service platform. At 422, the platform management component obtains and processes the telemetry data to determine the path-determinative operating state of the vehicle based on the telemetry data (or based on the indication provided by the on-board telematics device if pre-determined on-board the vehicle). Based on the path-determinative operating state identified at 422, the platform management component, at 424, directs the telemetry data to the second data processing stack instead of the first data processing stack, such as previously described with reference to the first set of interactions indicated at 402. At 426, the second data processing stack obtains and processes the telemetry data for the vehicle. Such processing may include determining and maintaining a set of vehicle state information based on stateless telemetry data that is directed to the second data processing stack. The telemetry data communicated at 420 and 424 may represent a data stream of multiple data communications occurring over a period of time. In such case, the second data processing stack may update the set of vehicle state information based on and responsive to the telemetry data obtained in each successive communication from the on-board telematics device. Within the context of stateless telemetry data, the second data processing stack may obtain pre-transfer state information from the first data processing stack to which the newly arriving telemetry data may be applied to determine a current set of state information for the vehicle.

In a first example implementation, the second data processing stack may request pre-transfer state information from the first data processing stack as indicated at 428. At 430, the first data processing stack receives the request and responds, at 432, with the pre-transfer state information for the vehicle. This pre-transfer state information may, for example, refer to the set of vehicle state information determined and maintained by the first data processing stack in the first set of interactions indicated at 402. At 434, the second data processing stack obtains the pre-transfer state information from the response, and determines and maintains the set of vehicle state information further based on the pre-transfer state information for the vehicle. For example, the pre-transfer state information may provide the base from which the second data processing stack continues by updating the set of vehicle state information based on and responsive to the telemetry data obtained in each successive communication from the on-board telematics device following the transfer.

In a second example implementation, the request and response interactions described with references to 428, 430, and 432 may be replaced by a third set of interactions 436. As previously described, at 422, the platform management component obtains and processes the telemetry data to determine an operating state of the vehicle based on telemetry data (or based on the indication provided by the on-board telematics device if pre-determined on-board the vehicle). Based on the operating state identified at 422, the platform management component, at 424, additionally directs a transfer command to the first data processing stack at 438. At 440, the first data processing stack obtains the transfer command, and in response to that transfer command directs the pre-transfer state information for the vehicle to the second data processing stack as indicated at 442. At 444, the second data processing stack obtains the pre-transfer state information, and determines and maintains the set of vehicle state information further based on the pre-transfer state information for the vehicle. For example, the pre-transfer state information may provide the base from which the second data processing stack continues by updating the set of vehicle state information based on and responsive to the telemetry data obtained in each successive communication from the on-board telemetry device following the transfer.

To initiate a state change, a state change message is put on a processing queue of the service platform, such as may be maintained by the platform management component. Each state change message then initiates a transfer of pre-transfer state information from a first data processing stack (e.g., as a higher performance stack associated with active vehicle states) to a second data processing stack (e.g., as a lower performance stack associated with inactive vehicle states). Once the transfer is completed, a vehicle record maintained for the vehicle at the service platform (e.g., by the platform management component) is marked as being associated with the second data processing stack. When an ignition on event is detected, telemetry data is immediately executed on the higher performance data processing stack, and the vehicle record is marked as being associated with the higher performance data processing stack (e.g., by the platform management component).

In at least some implementations, data is not copied from the lower performance to the higher performance data processing stack, such as where the higher performance data processing stack is not responsible for the complete history of the vehicle beyond the just current active session (e.g., trip) of the vehicle. For example, data requested by subscribers when the vehicle is parked (i.e., inactive) or for previous trips or previous days, may be served from the lower performance data processing stack. By contrast, certain current data requested by subscribers when the vehicle is currently active, such as current location, may be served from higher performance data processing stack. Data that has been successfully transferred from the higher performance to the lower performance data processing stack may be served from the lower performance data processing stack. However, data that has not yet been transferred from the higher performance to the lower performance data processing stack, such as shortly after transitioning from an active to an inactive operating state of the vehicle, may be served from the higher performance data processing stack, at least until such data has been successfully transferred.

A fourth set of interactions indicated at 446 provides another example of a transfer of state management from the first data processing stack to the second data processing stack by the platform management component using a redirect command. In this set of interactions, the on-board telematics device communicates telemetry data to the data processing stacks without traversing the platform management component. However, the platform management component may serve as a resource for directing or redirecting the on-board telematics device to the appropriate data processing stack.

At 448, the on-board telematics device is initially communicating telemetry data to the first data processing stack. At 450, the on-board telematics device requests a transfer from the first data processing stack to the second data processing stack, or alternatively, at 450, communicates an indication of a change in vehicle state for which state management is to be transferred (if pre-determined by the on-board telematics device). At 452, the platform management component receives the request or indication of the change in vehicle state, and responsive to this information communicates a redirect message to the on-board telematics device at 454. In an example, the redirect message indicates a network address corresponding to the second data processing stack. Alternatively, the network address corresponding to the second data processing stack may be pre-stored at the on-board telematics device, and the redirect message may instead take the form of a transfer command that indicates that the second data processing stack is to be used by the telematics device for subsequent telemetry data reporting. At 456, the on-board telematics device obtains the redirect message or transfer command, and begins communicating telemetry data for the vehicle to the second data processing stack, as indicated at 458. The telemetry data communicated at 458 may represent a data stream of multiple data communications occurring over a period of time. In such case, the second data processing stack may continue by updating the set of vehicle state information based on and responsive to the telemetry data obtained in each successive communication from the on-board telematics device.

In a first example implementation, the platform management component may further communicate a transfer command, at 460, to the first data processing stack responsive to the communications obtained at 450. At 462, the first data processing stack obtains the transfer command, and forwards the pre-transfer state information to the second data processing stack as indicated at 464. At 466, the second data processing stack obtains the pre-transfer state information communicated by the first data processing stack, and determines and maintains the set of vehicle state information further based on the pre-transfer state information for the vehicle. For example, the pre-transfer state information may provide the base from which the second data processing stack may continue by updating the set of vehicle state information based on and responsive to the telemetry data obtained in each successive communication from the on-board telematics device following the transfer.

In a second example implementation, the second data processing stack may request pre-transfer state information from the first data processing stack as indicated at 468. At 470, the first data processing stack receives the request and responds, at 472, with the pre-transfer state information for the vehicle. At 474, the second data processing stack obtains the pre-transfer state information from the response, and determines and maintains the set of vehicle state information further based on the pre-transfer state information for the vehicle. For example, the pre-transfer state information may provide the base from which the second data processing stack may continue by updating the set of vehicle state information based on and responsive to the telemetry data obtained in each successive communication from the on-board telematics device following the transfer.

A fifth set of interactions indicated at 476 provides another example of a transfer of state management from the first data processing stack to the second data processing stack without necessarily involving the platform management component. For example, the platform management component may be omitted from the service platform in at least some implementations. At 478, the on-board telematics device is initially communicating telemetry data to the first data processing stack, where the telemetry data is processed at 480. At 482, the on-board telematics device detects a change in vehicle state for which state management is to be transferred. At 484, the on-board telematics device begins communicating telemetry data to the second data processing stack. At 486, the second data processing stack obtains and processes the telemetry data for the vehicle. Such processing may include determining and maintaining a set of vehicle state information based on stateless telemetry data that is directed to the second data processing stack. The telemetry data communicated at 484 may represent a data stream of multiple data communications occurring over a period of time. In such case, the second data processing stack may update the set of vehicle state information based on and responsive to the telemetry data obtained in each successive communication from the on-board telematics device.

In a first example implementation, an indication of the transfer or a transfer command may be communicated by the on-board telematics device to the first data processing stack, which may cause the first data processing stack to communicate pre-transfer state information for the vehicle to the second data processing stack, such as a previously described with reference to 440, 442, 444. In a second example implementation, the second data processing stack, upon receiving telemetry data communicated by the on-board telematics device may request pre-transfer state information for the vehicle from the first data processing stack as indicated at 488. At 490, the first data processing stack receives the request and responds at 492 with a response that includes the pre-transfer state information. At 494, the second data processing stack obtains the pre-transfer state information from the response, and determines and maintains the set of vehicle state information further based on the pre-transfer state information for the vehicle. For example, the pre-transfer state information may provide the base from which the second data processing stack may continue by updating the set of vehicle state information based on and responsive to the telemetry data obtained in each successive communication from the on-board telematics device following the transfer.

A sixth set of interactions indicated at 496 provides another example of a transfer of state management from the first data processing stack to the second data processing stack without necessarily involving the platform management component. For example, the platform management component may be omitted from the service platform in at least some implementations. At 498, the on-board telematics device is initially communicating telemetry data to the first data processing stack, where the telemetry data is processed at 500. In this example, the first data processing stack determines that a change of vehicle state has occurred for which a transfer of state management to the second data processing stack is to be performed. In response to this determination, at 510, the first data processing stack communicates a redirect message or transfer command to the on-board telematics device. The redirect message or transfer command may include the information previously described with reference to 454 to enable the on-board telematics device to begin communicating telemetry data to the second data processing stack. At 512, the on-board telematics device obtains the redirect message or transfer command, and at 516 begins communicating telemetry data to the second data processing stack. The second data processing stack obtains the telemetry data at 518.

In a first example implementation, responsive to the determination at 500 that a transfer of state management is to be performed, the first data processing stack communicates the pre-transfer state information for the vehicle to the second data processing stack at 514. In a second example implementation, a request and response approach may be initiated by the second data processing stack (such as previously described with reference to 428, 430, 432) responsive to receiving the telemetry data at 518. At 518, the second data processing stack further obtains the pre-transfer state information from the first data processing stack, and processes the telemetry data in combination with the pre-transfer state information. Such processing may include maintaining a set of vehicle state information based on stateless telemetry data that is directed to the second data processing stack using the pre-transfer state information as a base. The telemetry data communicated at 516 may again represent a data stream of multiple data communications occurring over a period of time. In such case, the second data processing stack may continue by updating the set of vehicle state information from the pre-transfer state information based on and responsive to the telemetry data obtained in each successive communication from the on-board telematics device.

In at least some implementations, the transfer of state management from a first data processing stack to a second data processing stack may be delayed for a pre-defined period of time (i.e., a grace period) following detection of a path-determinative operating state of the vehicle that corresponds to the second data processing stack. For example, if the first data processing stack corresponds to a higher performance data processing stack of the service platform and the second data processing stack corresponds to a lower performance data processing stack of the service platform, when a change to the path-determinative operating state is determined (e.g., ignition off), the logic implementing the transfer of state management may initiate a grace period using a timer to delay the transfer for pre-defined period of time (e.g., 5 minutes, 10 minutes, etc.) so that state management is not immediately transferred from the first to the second data processing stack at ignition off. If the path-determinative operating state persists for the grace period, then the transfer of state management may be initiated, for example, to direct telemetry data communicated by the on-board telematics device from the first to the second data processing stack. This grace period may be used to manage the cost associated with transferring state management and scenarios such as fuel refueling operations and other brief inactive vehicle states. A grace period may be not be used for the reverse transfer of state management from the lower performance to the higher performance data processing stack in response to an ignition on event or other activation of the vehicle, for example.

In accordance with the preceding disclosure, a non-limiting example of a computerized method may include: obtaining telemetry data for a vehicle at an edge server system of a service platform, the telemetry data communicated by an on-board telematics device of the vehicle over a communications network; determining an operating state of the vehicle at the edge server system based on the telemetry data, the operating state including either an active operating state or inactive operating state of the vehicle; directing the telemetry data for the vehicle to a first data processing stack of the service platform responsive to the operating state including the active operating state, the first data processing stack including a first application layer and a first database layer implemented by a first set of server devices of the service platform; and directing the telemetry data for the vehicle to a second data processing stack of the service platform responsive to the operating state including the inactive operating state, the second data processing stack including a second application layer and a second database layer implemented by a second set of server devices of the service platform, the second data processing stack having a greater latency of write/read persistency than the first data processing stack. This method or other implementation disclosed herein may further include obtaining subsequent telemetry data for the vehicle at the edge server system of the service platform, the subsequent telemetry data communicated by the on-board telematics device of the vehicle over the communications network after the telemetry data; determining a change in the operating state of the vehicle from the active operating state to the inactive operating state at the edge server system based on the subsequent telemetry data; and responsive to the change in the operating state of the vehicle from the active operating state to the inactive operating state, transitioning from the first data processing stack to the second data processing stack by: directing the subsequent telemetry data for the vehicle to the second data processing stack of the service platform, transferring the telemetry data or a processed form thereof from the first data processing stack to the second data processing stack, and processing the subsequent telemetry data and the telemetry data or a processed form thereof in combination to obtain one or more vehicle states. This method or other implementation disclosed herein may further include storing the one or more vehicle states in the second database layer of the second data processing stack, and communicating the one or more vehicle states from the second data processing stack to one or more subscribers over the communications network. This method or other implementation disclosed herein may further include delaying the transitioning from the first data processing stack to the second data processing stack for a threshold period of time following determining the change in the operating state of the vehicle from the active operating state to the inactive operating state by: during the threshold period of time, directing the subsequent telemetry data to the first data processing stack; and following expiration of the threshold period of time, performing said transitioning from the first data processing stack to the second data processing stack. This method or other implementation disclosed herein may further include obtaining additional subsequent telemetry data for the vehicle at the edge server system of the service platform, the additional subsequent telemetry data communicated by the on-board telematics device of the vehicle over the communications network after the subsequent telemetry data; during the threshold period of time, continuing to direct the additional subsequent telemetry data to the first data processing stack; and following expiration of the threshold period of time, performing said transitioning from the first data processing stack to the second data processing stack, and directing the additional subsequent telemetry data to the second data processing stack. This method or other implementation disclosed herein may further include the telemetry data taking the form of a stateless data stream communicated by the on-board telematics device of the vehicle over a period of time in which the telemetry data directed to the first data processing stack is processed at the first data processing stack to obtain one or more vehicle states of the vehicle based on the stateless data stream, or the telemetry data directed to the second data processing stack is processed at the second data processing stack to obtain one or more vehicle states of the vehicle based on the stateless data stream. This method or other implementation disclosed herein may further include the on-board telematics device of the vehicle obtaining at least some of the telemetry data from an on-board electronic system of the vehicle over an OBD interface. This method or other implementation disclosed herein may further include the on-board telematics device of the vehicle obtaining at least some of telemetry data from one or more sensor devices of the on-board telematics device. This method or other implementation disclosed herein may further include the on-board telematics device being integrated with or forming part of the on-board electronic system of the vehicle. This method or other implementation disclosed herein may further include the on-board telematics device communicating the telemetry data from the vehicle over a wireless network component of the communications network. This method or other implementation disclosed herein may further include the active operating state corresponding to an ignition-on condition and the inactive operating state corresponding to an ignition-off condition of the vehicle. This method or other implementation disclosed herein may further include the active operating state corresponding to an ignition-on condition or an ignition-off condition for a threshold period of time following transition from the ignition-on condition to the ignition-off condition, and the inactive operating state corresponding to the ignition-off condition of the vehicle following the threshold period of time. This method or other implementation disclosed herein may further include obtaining subsequent telemetry data for the vehicle at the edge server system of the service platform in which the subsequent telemetry data is communicated by the on-board telematics device of the vehicle over the communications network after the telemetry data; determining a change in the operating state of the vehicle from the inactive operating state to the active operating state at the edge server system based on the subsequent telemetry data; responsive to the change in the operating state of the vehicle from the inactive operating state to the active operating state, transitioning from the second data processing stack to the first data processing stack by: directing the subsequent telemetry data for the vehicle to the first data processing stack of the service platform, processing the subsequent telemetry data at the first data processing stack to obtain one or more vehicle states, storing the one or more vehicle states in the first database layer of the first data processing stack, and communicating the one or more vehicle states from the first data processing stack to one or more subscribers over the communications network during the active operating state of the vehicle.

In accordance with the preceding disclosure, a non-limiting example of a computing system may include a first set of one or more servers hosting a first data processing stack that includes a first application layer and a first database layer; a second set of one or more servers hosting a second data processing stack that includes a second application layer and a second database layer, the second data processing stack having a greater latency of write/read persistency than the first data processing stack; and a service platform including an edge server system of one or more servers hosting platform management component that is configured to: obtain telemetry data for a vehicle, the telemetry data communicated by an on-board telematics device of the vehicle over a communications network; determine an operating state of the vehicle based on the telemetry data, the operating state including either an active operating state or inactive operating state of the vehicle; direct the telemetry data for the vehicle to the first data processing stack responsive to the operating state including the active operating state or responsive to the operating state including the inactive operating state for a threshold period of time following transition from the active operating state; and direct the telemetry data for the vehicle to the second data processing stack of the service platform responsive to the operating state including the inactive operating state after the threshold period of time following the transition from the active operating state. This system or other implementation disclosed herein may further include the platform management component being further configured to: following the threshold period of time after the transition from the active operating state to the inactive operating state of the vehicle, transfer the telemetry data or a processed form thereof from the first data processing stack to the second data processing stack. This system or other implementation disclosed herein may further include the first data processing stack being further configured to: processes the telemetry data at the first application layer to obtain one or more vehicle states based on a time-based series of stateless data contained within the telemetry data; store the one or more vehicle states in the first database layer of the first data processing stack, and communicate the one or more vehicle states from the first data processing stack to one or more subscribers over the communications network during the active state of the vehicle or during the inactive state of the vehicle for the threshold period of time following transition from the active operating state. This system or other implementation disclosed herein may further include the second data processing stack being further configured to: processes the telemetry data at the second application layer to obtain one or more vehicle states based on a time-based series of stateless data contained within the telemetry data; store the one or more vehicle states in the second database layer of the second data processing stack, and communicate the one or more vehicle states from the second data processing stack to one or more subscribers over the communications network during the inactive state of the vehicle following the threshold period of time after the transition. This system or other implementation disclosed herein may further include the active operating state corresponding to an ignition-on condition and the inactive operating state corresponding to an ignition-off condition of the vehicle. This system or other implementation disclosed herein may further include the on-board telematics device of the vehicle obtaining at least some of the telemetry data from an on-board electronic system of the vehicle over an OBD interface. This system or other implementation disclosed herein may further include the on-board telematics device. This system or other implementation disclosed herein may further include the on-board telematics device being integrated with or forming part of an on-board electronic system of the vehicle.

It will be understood that the configurations and/or approaches described herein are exemplary in nature, and that these specific examples or implementations are not to be considered in a limiting sense, because numerous variations are possible. The specific methods described herein may represent one or more of any number of processing strategies. As such, various acts illustrated and/or described may be performed in the sequence illustrated and/or described, in other sequences, in parallel, or omitted. Likewise, the order of the above-described methods may at times be changed. The subject matter of the present disclosure includes all novel and nonobvious combinations and sub-combinations of the various configurations, approaches, systems, methods, processes, operations, functions, techniques, and other features or properties disclosed herein, as well as any and all equivalents thereof.

The invention claimed is:

1. A computerized method, comprising:
    obtaining telemetry data for a vehicle at an edge server system of a service platform, the telemetry data communicated by an on-board telematics device of the vehicle over a communications network;
    determining an operating state of the vehicle at the edge server system based on the telemetry data, the operating state including either an active operating state or inactive operating state of the vehicle;
    directing the telemetry data for the vehicle to a first data processing stack of the service platform responsive to the operating state including the active operating state, the first data processing stack including a first application layer and a first database layer implemented by a first set of server devices of the service platform;
    directing the telemetry data for the vehicle to a second data processing stack of the service platform responsive to the operating state including the inactive operating state, the second data processing stack including a second application layer and a second database layer implemented by a second set of server devices of the service platform, the second data processing stack having a greater latency of write/read persistency than the first data processing stack;
    obtaining subsequent telemetry data for the vehicle at the edge server system of the service platform, the subsequent telemetry data communicated by the on-board telematics device of the vehicle over the communications network after the telemetry data;
    determining a change in the operating state of the vehicle from the active operating state to the inactive operating state at the edge server system based on the subsequent telemetry data; and
    responsive to the change in the operating state of the vehicle from the active operating state to the inactive operating state, transitioning from the first data processing stack to the second data processing stack by:
        directing the subsequent telemetry data for the vehicle to the second data processing stack of the service platform,
        transferring the telemetry data or a processed form of the telemetry data from the first data processing stack to the second data processing stack, and
        processing the subsequent telemetry data and the telemetry data or the processed form of the telemetry data in combination to obtain one or more vehicle states.

2. The method of claim 1, further comprising:
    storing the one or more vehicle states in the second database layer of the second data processing stack, and
    communicating the one or more vehicle states from the second data processing stack to one or more subscribers over the communications network.

3. The method of claim 1, further comprising:
    delaying said transitioning from the first data processing stack to the second data processing stack for a threshold period of time following determining the change in the operating state of the vehicle from the active operating state to the inactive operating state by:
    during the threshold period of time, directing the subsequent telemetry data to the first data processing stack; and
    following expiration of the threshold period of time, performing said transitioning from the first data processing stack to the second data processing stack.

4. The method of claim 3, further comprising:
    obtaining additional subsequent telemetry data for the vehicle at the edge server system of the service platform, the additional subsequent telemetry data communicated by the on-board telematics device of the vehicle over the communications network after the subsequent telemetry data;
    during the threshold period of time, continuing to direct the additional subsequent telemetry data to the first data processing stack; and
    following expiration of the threshold period of time, performing said transitioning from the first data processing stack to the second data processing stack, and directing the additional subsequent telemetry data to the second data processing stack.

5. The method of claim 1, wherein the telemetry data takes the form of a stateless data stream communicated by the on-board telematics device of the vehicle over a period of time; and wherein the method further comprises:
processing the telemetry data directed to the first data processing stack at the first data processing stack to obtain one or more vehicle states of the vehicle based on the stateless data stream, or
processing the telemetry data directed to the second data processing stack at the second data processing stack to obtain one or more vehicle states of the vehicle based on the stateless data stream.

6. The method of claim 1, wherein the on-board telematics device of the vehicle obtains at least some of the telemetry data from an on-board electronic system of the vehicle over an OBD interface.

7. The method of claim 6, wherein the on-board telematics device of the vehicle obtains at least some of telemetry data from one or more sensor devices of the on-board telematics device.

8. The method of claim 1, wherein the on-board telematics device is integrated with or forms part of an on-board electronic system of the vehicle.

9. The method of claim 1, wherein the on-board telematics device communicates the telemetry data from the vehicle over a wireless network component of the communications network.

10. The method of claim 1, wherein the active operating state corresponds to an ignition-on condition and the inactive operating state corresponds to an ignition-off condition of the vehicle.

11. The method of claim 1, wherein the active operating state corresponds to an ignition-on condition or an ignition-off condition for a threshold period of time following transition from the ignition-on condition to the ignition-off condition, and the inactive operating state corresponds to the ignition-off condition of the vehicle following the threshold period of time.

12. The method of claim 1, obtaining subsequent telemetry data for the vehicle at the edge server system of the service platform, the subsequent telemetry data communicated by the on-board telematics device of the vehicle over the communications network after the telemetry data;

determining a change in the operating state of the vehicle from the inactive operating state to the active operating state at the edge server system based on the subsequent telemetry data;
responsive to the change in the operating state of the vehicle from the inactive operating state to the active operating state, transitioning from the second data processing stack to the first data processing stack by:
directing the subsequent telemetry data for the vehicle to the first data processing stack of the service platform,
processing the subsequent telemetry data at the first data processing stack to obtain one or more vehicle states,
storing the one or more vehicle states in the first database layer of the first data processing stack, and
communicating the one or more vehicle states from the first data processing stack to one or more subscribers over the communications network during the active operating state of the vehicle.

13. A computing system, comprising:
a first set of one or more server devices hosting a first data processing stack that includes a first application layer and a first database layer;
a second set of one or more server devices hosting a second data processing stack that includes a second application layer and a second database layer, the second data processing stack having a greater latency of write/read persistency than the first data processing stack; and
a service platform including an edge server system of one or more server devices hosting a platform management component that is configured to:
obtain telemetry data for a vehicle, the telemetry data communicated by an on-board telematics device of the vehicle over a communications network;
determine an operating state of the vehicle based on the telemetry data, the operating state including either an active operating state or inactive operating state of the vehicle;
direct the telemetry data for the vehicle to the first data processing stack responsive to the operating state including the active operating state or responsive to the operating state including the inactive operating state for a threshold period of time following transition from the active operating state; and
direct the telemetry data for the vehicle to the second data processing stack of the service platform responsive to the operating state including the inactive operating state after the threshold period of time following the transition from the active operating state; and
wherein the first data processing stack is configured to:
process the telemetry data at the first application layer to obtain one or more vehicle states based on a time-based series of stateless data contained within the telemetry data;
store the one or more vehicle states in the first database layer of the first data processing stack; and
communicate the one or more vehicle states from the first data processing stack to one or more subscribers over the communications network during the active operating state of the vehicle or during the inactive operating state of the vehicle for the threshold period of time following transition from the active operating state.

14. The computing system of claim 13, wherein the platform management component is further configured to:
following the threshold period of time after the transition from the active operating state to the inactive operating state of the vehicle, transfer the telemetry data or a processed form of the telemetry data from the first data processing stack to the second data processing stack.

15. The computing system of claim 13, wherein the second data processing stack is configured to:
process the telemetry data at the second application layer to obtain one or more vehicle states based on a time-based series of stateless data contained within the telemetry data;
store the one or more vehicle states in the second database layer of the second data processing stack, and
communicate the one or more vehicle states from the second data processing stack to one or more subscribers over the communications network during the inactive operating state of the vehicle following the threshold period of time after the transition.

16. The computing system of claim 13, wherein the active operating state corresponds to an ignition-on condition and the inactive operating state corresponds to an ignition-off condition of the vehicle.

17. The computing system of claim 13, wherein the on-board telematics device of the vehicle obtains at least some of the telemetry data from an on-board electronic system of the vehicle over an OBD interface; and
   wherein the computing system further comprises the on-board telematics device.

18. The computing system of claim 13, wherein the on-board telematics device is integrated with or forms part of an on-board electronic system of the vehicle.

* * * * *